(12) United States Patent
Zwayer et al.

(10) Patent No.: US 12,134,151 B2
(45) Date of Patent: Nov. 5, 2024

(54) METHODS AND APPARATUS FOR A REMOVABLE WELDER SYSTEM

(71) Applicant: Illinois Tool Works Inc., Glenview, IL (US)

(72) Inventors: Jake Zwayer, Appleton, WI (US); Ben Froland, Glenview, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 633 days.

(21) Appl. No.: 16/714,184

(22) Filed: Dec. 13, 2019

(65) Prior Publication Data

US 2020/0189020 A1 Jun. 18, 2020

Related U.S. Application Data

(60) Provisional application No. 62/779,197, filed on Dec. 13, 2018.

(51) Int. Cl.
*B23K 9/10* (2006.01)
(52) U.S. Cl.
CPC .......... *B23K 9/1043* (2013.01); *B23K 9/1081* (2013.01)
(58) Field of Classification Search
CPC .. B23K 9/1043; B23K 9/1081; B23K 9/1006; H05K 7/1432
See application file for complete search history.

(56) References Cited

U.S. PATENT DOCUMENTS

| | | | | |
|---|---|---|---|---|
| 2013/0292366 A1* | 11/2013 | Enyedy | .................. | B23K 9/124 |
| | | | | 219/137.2 |
| 2014/0069906 A1* | 3/2014 | Dessart | .................. | B23K 9/323 |
| | | | | 219/136 |
| 2015/0022001 A1* | 1/2015 | Goei | ...................... | H02J 7/0068 |
| | | | | 307/65 |
| 2015/0083700 A1* | 3/2015 | Burkhart | .............. | B23K 9/1006 |
| | | | | 219/133 |
| 2016/0098051 A1* | 4/2016 | Enyedy | ................. | H02J 7/1492 |
| | | | | 307/52 |
| 2016/0136749 A1* | 5/2016 | Lee | ....................... | B23K 9/1006 |
| | | | | 219/130.1 |
| 2017/0036291 A1* | 2/2017 | Enyedy | ................ | B23K 9/1043 |
| 2019/0217426 A1* | 7/2019 | Dekker | .................... | B23K 9/32 |

* cited by examiner

*Primary Examiner* — Brian W Jennison
(74) *Attorney, Agent, or Firm* — McAndrews, Held & Malloy, Ltd.

(57) ABSTRACT

Apparatus and methods are provided for an engine driven welding-type power system that includes an engine to drive an electric generator to provide a first power output, and a removable welder having an energy storage device to provide a second power output. The system includes a housing having a dock to store a removable welder. While stored within the dock, the energy storage device is recharged by the first power output. Once removed from the dock, the removable welder is configured to operate independently of the power system.

21 Claims, 4 Drawing Sheets

METHODS AND APPARATUS FOR A REMOVABLE WELDER SYSTEM

CROSS REFERENCE TO RELATED APPLICATIONS

This application hereby claims priority to and the benefit of U.S. Provisional Application No. 62/779,197, entitled "Methods and Apparatus for a Removable Welder System," filed Dec. 13, 2018. The above listed U.S. Application is hereby incorporated by reference in its entirety for all purposes.

BACKGROUND

Conventional welding-type power supplies provide power for welding-type tools and operations. Some such power supplies are coupled to a fossil fuel-powered engine that drives an electric generator. In some cases, the generator output can provide power to a rechargeable power source, such as a battery. The battery power can be used to augment the output from the generator and/or substitute the generator output for particular operations. However, many welding-type power supplies are large and require additional platforms, such as trucks, and infrastructure, such as roads, to locate the power supply on a jobsite. Further, if a particular workpiece to be welded is beyond the reach of the welding-type power supply, long cables may be employed. The long cables are subject to damage on the jobsite, interference, and power loss, to name but a few challenges. Therefore, a system that can employ the power generation capabilities of a welding-type power supply, while avoiding the use of additional platforms, infrastructure, and/or long cables, would provide many advantages.

SUMMARY

Apparatus and methods are disclosed of an engine driven welding-type power system that includes an engine to drive an electric generator to provide a first power output, and a removable welder having an energy storage device to provide a second power output. In particular, the system includes a housing having a dock to store a removable welder. While stored within the dock, the energy storage device is recharged by the first power output. Once removed from the dock, the removable welder is configured to operate independently of the power system, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Disclosed are examples of an engine driven welding-type power system that includes an engine to drive an electric generator to provide a first power output, and a removable welder that includes an energy storage device to provide a second power output. In particular, the system includes a housing having a dock to store a removable welder. While stored within the dock, the energy storage device is recharged by the first power output. Additionally or alternatively, the removable welder can channel the first power output to augment or substitute the second power output while docked.

Once removed from the dock, the removable welder is configured to operate independently of the power system. For example, the second power output from the energy storage device may provide welding-type power and/or power for an auxiliary device. However, being removable from the system and also portable (e.g., capable of a single-person carry), the removable welder can be transported to areas where the power system either cannot access and/or would be transported at great effort. Thus, welding operations can be performed at a distance from the power system without the need for long power cords or the need of infrastructure to support vehicle traffic. Moreover, power systems of this type are often used when utility power is not available. Advantageously, the removable welder recharges from an output of the power system, without the need of access to utility power.

Accordingly, the presently disclosed power system provides a combined engine-driven generator and energy storage device configured to generate a high capacity output (e.g., a hybrid systems), as well as the flexibility of portable welding capabilities.

In disclosed examples, a welding-type power system includes an engine configured to drive an electric generator to provide a first power output. A removable welder includes an energy storage device and configured to provide a second power output. A housing is configured to house the engine, the electric generator, and comprising a dock for storage of the removable welder. The dock comprising a connector to provide the first power output to recharge the energy storage device when the removable welder is stored in the dock.

In examples, the removable welder includes a welding output, with the removable welder configured to provide the second output to the welding output when removed from the dock and operating as a stand-alone unit. In some examples, the second power output provides welding-type power suitable to perform welding, cutting or cladding operations, such as with a welding, cutting or cladding tool. In examples, the removable welder connects with the first power output when stored in the dock, and to provide the first power output from the welding output when stored in the dock. In some examples, a controller controls the engine, the generator and the removable welder when the removable welder is stored in the dock.

In examples, a system user interface configured to send information to and receive information from the controller, wherein the information comprises instructions to control the engine, the generator, or the removable welder when the removable welding is stored in the dock. In examples, a welder user interface configured to control an operation of the removable welder. The controller controls the engine, the generator and the removable welder to combine the first and second power outputs when the removable welder is stored in the dock.

In some examples, the removable welder includes an auxiliary port to provide an auxiliary output from the energy storage device. In some examples, the housing includes an adjustable panel to enclose the removable welder when stored in the dock. In examples, the energy storage device comprises one or more of a lead acid battery, a nickel cadmium battery, a lithium ion battery, a capacitor, a super-capacitor, a fuel cell, or any combination thereof.

In disclosed examples, a welding-type power system includes an engine configured to drive an electric generator to provide a first power output, a first removable welder comprising a first energy storage device and configured to provide a second power output, a second removable welder comprising a second energy storage device and configured to provide a third power output, and a housing configured to house the engine and the electric generator. The housing includes a first and second dock for storage of the first and second removable welders, each dock comprising a connector to provide the first power output to recharge the first and second energy storage devices when the first and second removable welders are stored in the first and second docks.

In examples, a controller monitors an energy level of the first or second energy storage device. In some examples, the controller compares the respective energy level to one or more threshold energy levels; and controls a connection to provide the first power output to recharge the first or second energy storage device in response to the energy level of the respective energy storage device falling below a first threshold energy level.

In some examples, the connection comprises a power converter configured to condition the first power output to provide battery charging power to the first or second energy storage device. In examples, the controller generates an alert in response to an energy level of the first or second energy storage device falling below a second threshold energy level.

In some examples, a system user interface configured to send information to and receive information from the controller, wherein the information comprises instructions to control the engine, the generator, the first removable welder or the second removable welder when the first or second removable welders are stored in the dock.

In examples, a system network interface, and where the first and second removable welders each comprises a respective welder network interface configured to communicate with the system network interface. In some examples, the welder network interfaces are configured to send information to and receive information from the system network interface, the information comprising instructions to control the engine, the generator, the first removable welder or the second removable welder.

Accordingly, a system with improved, customizable efficiency tools is disclosed. Thus, the system maximizes fuel economy, extends the life of the engine and/or the energy storage device, while avoiding unnecessary noise and exhaust from limiting engine use As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "controller" or "control circuitry" includes digital and/or analog circuitry, discrete or integrated circuitry, microprocessors, DSPs, FPGAs, etc., and/or software, hardware and firmware, located on one or more boards, used to control all or part of a welding-type system or a device such as a power supply, power source, engine or generator.

As used herein, a "circuit" or "circuitry" includes any analog and/or digital components, power and/or control elements, such as a microprocessor, digital signal processor (DSP), software, and the like, discrete and/or integrated components, or portions and/or combinations thereof.

As used herein, the term "energy storage device" is any device that stores energy, such as, for example, a battery, a super capacitor, etc.

As used herein, the term "memory" includes volatile and non-volatile memory, and can be arrays, databases, lists, etc.

As used herein, the term "torch" or "welding-type tool" can include a hand-held or robotic welding torch, gun, or other device used to create the welding arc.

As used herein, the term "welding mode" or "welding operation" is the type of process or output used, such as CC, CV, pulse, MIG, TIG, spray, short circuit, etc.

As used herein, the term "boost converter" (e.g., a step-up converter) is a converter used in a circuit that boosts a voltage. For example, a boost converter can be a type of step-up converter, such as a DC-to-DC power converter that steps up voltage while stepping down current from its input (e.g., from the energy storage device) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

Figure 1:
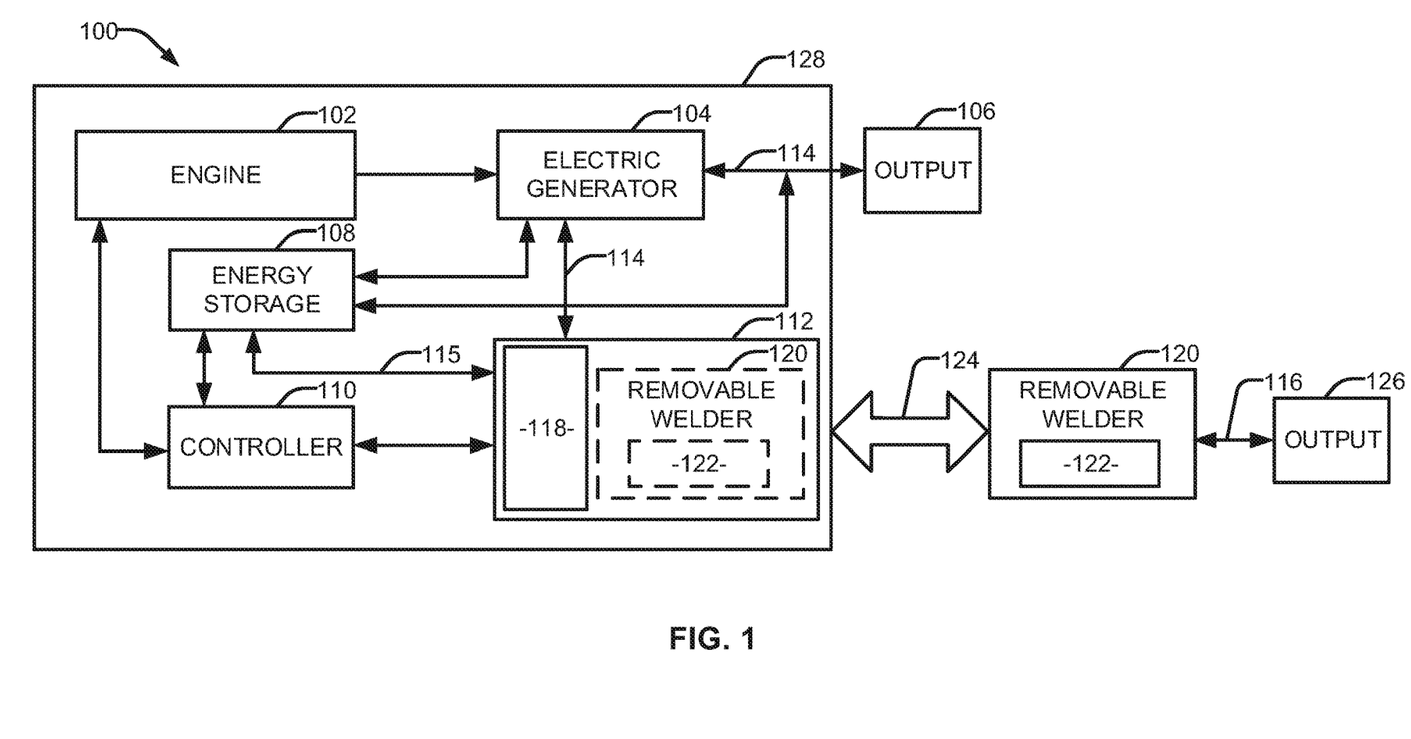
FIG. 1 is a block diagram of an example welding-type power system in accordance with aspects of this disclosure.

FIG. 1 is a block diagram of an example welding-type power system 100 within a housing 128. The example power system 100 includes an engine 102 connected to an electric generator 104 to provide power to an output 106 (e.g., a power receptacle). An energy storage device 108 can also be connected to the output 106, which can provide power to a load connected thereto (e.g., a welding-type torch, etc.). A removable welder 120 includes a removable energy storage device 122, and is configured to provide a second power output 116.

The housing 128 includes a dock 112 configured to house the removable welder 120. The dock 112 provides a connector 118 configured to connect the removable welder 112 to the one or more of the generator 104, the energy storage device 108, or a controller 110. For instance, the connector 118 can provide one or more interfaces to provide one-way or two-way communication of information (e.g., with the controller 110) and/or power (e.g., with the energy storage device 108 and/or the electric generator 104). Thus, when inserted into the dock 112, the electric generator 104 and/or the energy storage device 108 can provide power outputs 114, 115, respectively, to recharge the energy storage device 122. In some examples, the removable welder 120 is configured to channel the power outputs 114, 115 to augment or substitute the power from the energy storage device 122 while inserted in the dock 112.

As shown in dotted lines, the removable welder 120 may be fully or partially enclosed in the housing 128 when inserted into the dock 112. Arrow 124 indicates that the removable welder 120 can be detached and separated from the dock 112. Due to the inclusion of energy storage device 122, the removable welder 120 retains the ability to provide the second power output 116, such as to power an output 126 (e.g., a welding-type torch) when removed from the dock 112. In some examples, one or more of the energy storage devices 108, 122 are a rechargeable battery pack (e.g., a lithium-ion battery, a nickel-metal hydride battery, lead-acid battery, etc.). In other examples, the energy storage devices 108, 122 are one or more of a hybrid battery module, a capacitor, a supercapacitor, a fuel cell, or any other type of suitable storage device, or a combination of a rechargeable battery pack and a hybrid battery module.

The controller 110 can be connected to one or more of the engine 102, generator 104, output 106, energy storage device 108 and removable welder 120. The controller 110 is configured to receive and analyze information (from one or more sensors, one or more sources via user and/or network interfaces, etc.), and to control one or more of the connected components based on the information. As an example, when inserted into the dock 112, the removable welder 120 may provide information (e.g. via the connector 118) that the energy storage device 122 requires a charge. The controller 110 is configured to control a connection to the removable welder 120 to supply power, such as by connecting one or more of the energy storage device 108 or the electric generator 104. The controller 110 is also configured to determine a power draw on the system 100. For example, if one or more loads are drawing power via the outputs 106, 126, and/or a high power operation is being performed, the controller 110 can activate the engine 102 or cause the engine speed to increase, and/or combine one or more of the outputs 114, 115, 116 to augment the power for the load(s).

In an example, the power outputs 106, 126 may be configured for a particular type of connection (e.g., a welding-type torch cable), while in other examples the power outputs 106, 126 may be modified to accept multiple types of connectors. In the example of FIG. 1, the outputs 106, 126 may be configured with multiple connection outputs, and/or one or more adapters to accommodate various loads. The various loads can include a welding-type torch (e.g., MIG, TIG, GMAW, FCAW, plasma cutter, etc.), an auxiliary device (e.g., a preheating device, a wire feeder, a grinder, lighting, etc.), as well as a rechargeable battery. In some examples, the various loads may be identified at the controller 110 by a feedback signal. Thus, the feedback signal can inform the controller 110 as to what load is present, identify a corresponding mode of operation, etc. For example, when the load is a welding-type torch, the controller 110 can determine a type of load (e.g., associated with a welding mode of operation) associated with an expected measured power draw.

Additionally or alternatively, a rechargeable battery or auxiliary type tool, including a wire feeder, can be connected to one or more of the outputs 106, 126, such that the controller 110 determines the type of load and mode of operation (e.g., a battery charging mode, a 120 V output, etc.). For example, in an embodiment, the removable welder 120 can be configured as a dockable energy storage device that is configured to mate with one or more auxiliary devices. In this example, the dockable energy storage device is housed in the dock 112 for recharging and/or hybrid power output operations. When removed from the dock 112, the dockable energy storage device can power any number of devices via one or more power regulators (e.g., a switched mode power supply, AC/DC converter, DC-DC converter, step-up converter, step-down converter, bi-directional converter, etc.). Thus, the dockable energy storage device can power a range of devices, from power tools, wire feeders, as well as portable welding systems.

Figure 2:
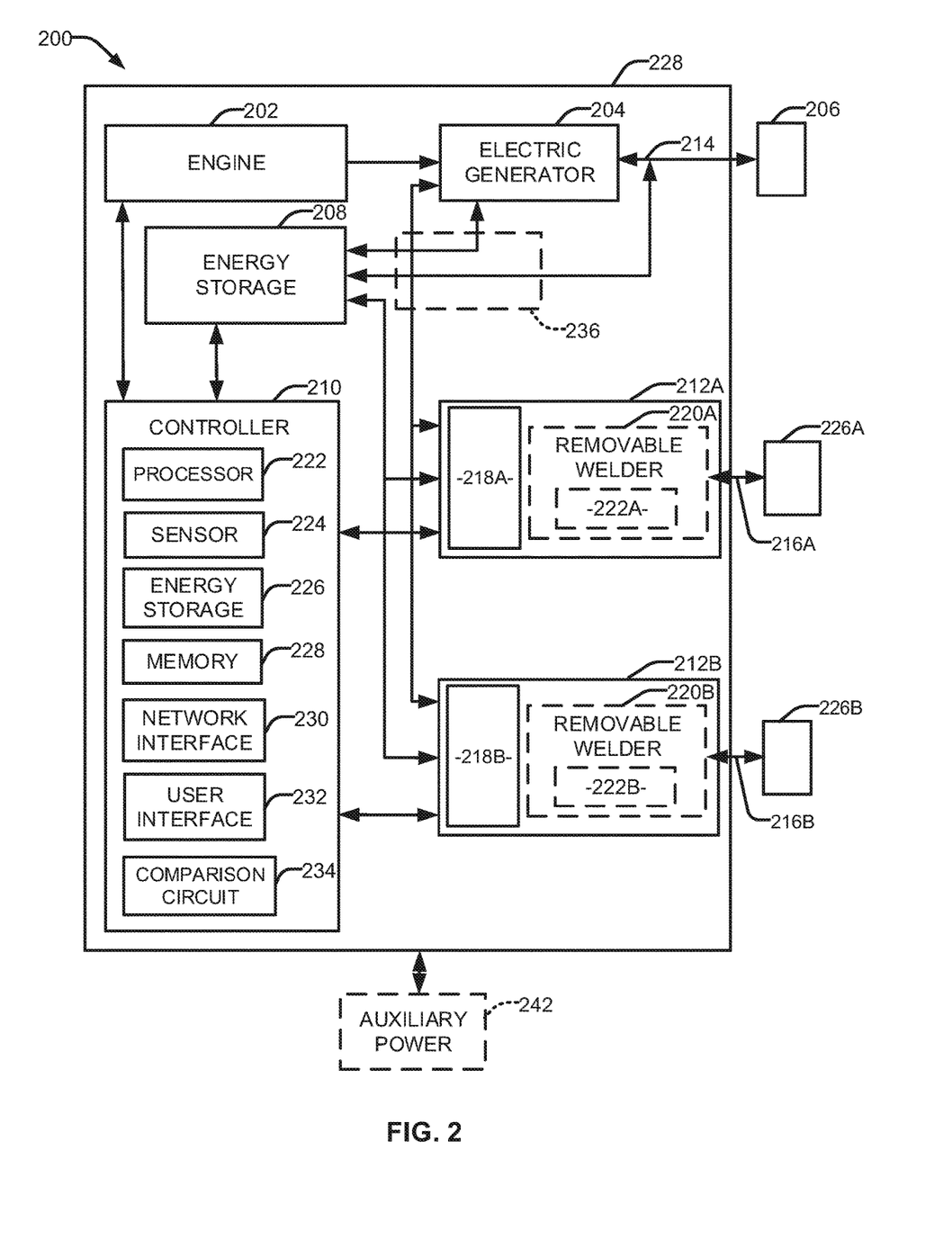
FIG. 2 illustrates a block diagram of another example welding-type power system in accordance with aspects of this disclosure.

FIG. 2 is a block diagram of an example welding-type power system 200. System 200 can be configured to operate with one or all of the features disclosed with respect to system 100, as provided herein. The example power system 200 provides a housing 228 configured to enclose all or a portion of one or more of the engine 202, the electric generator 204, the energy storage device 208, and the controller 210. The system 200 is configured to provide a power output 214 with a voltage sufficient to power a welding-type tool, directed to an output 206 (e.g., a welding output, a battery charging output, and/or an auxiliary power output).

In the example of FIG. 2, the housing 228 includes a first dock 212A to house a first removable welder 220A, and a second dock 212B to house a second removable welder 220B. Each of the first and second docks 212A, 212B provide a first and second connector 218A, 218B, respectively, to interface with a removable welder(s) when inserted into the respective dock. Each of the first and second removable welders is configured to operate independently of the system 200, such as when removed from a respective dock. For instance, each of the first and second removable welders includes an energy storage device 222A, 222B, which is capable of providing power 216A, 216B for an output 226A, 226B, respectively. Additionally or alternatively, when inserted into the first and second docks 212A, 212B, the power output 216A, 216B may be augmented with or substituted by an output from one or more of the system energy storage device 208 or the electric generator 204.

The docks 212A, 212B can be configured to completely or partially enclose a removable welder. While inserted into a dock, a removable welder can be secured therein by a locking mechanism (e.g., a bolt, screw, lever, hinged door, etc.). In some examples, an interior of the dock has dimensions greater than exterior dimensions of a housing of the removable welder, such that little space separates the interior of the dock and the exterior of the removable welder. In examples, a door or other paneling may be included to protect the dock from the environment when the removable welder is not in the dock, and/or protect the removable welder when inserted in the dock.

The removable welder may also include one or more connectors that allow the welder to communicate information and/or power signals with the system 200 without being placed in the dock. For instance, the system 200 is configured with two docks 212A, 212B to house removable welders 220A, 220B. A third removable welder (not shown) may be connected to one or more of outputs 206, 226A, 226B to draw power (i.e. to recharge an energy storage device, augment and/or substitute the removable welder's power output). Further, information may be communicated between the third removable welder and the system 200 via one or more system interfaces 230, 232, including via wired and/or wireless communications, to transmit and receive data and instructions.

One or more exterior sides of the removable welder can include one or more panels having an interface (e.g., a display, one or more input elements) and/or output terminals (e.g., for a welding-type tool, a 115 and/or 220 Volt receptacle, etc.). In some examples, the panel may remain exposed while the removable welder is inserted into the dock, such that controls and operations of the removable welder may be controlled from the panel. In other examples, the controller 210 is configured to control the removable welder, while inserted into the dock (via a connector 118, 218A, 218B) and/or having been removed (via network interface 230 over a wired and/or wireless communications channel).

When inserted in a dock, a removable welder may be configured to automatically engage with a respective connector 218A, 218B, such as to share information and/or receive power from the system 200. In other examples, a user input may set one or more parameters to govern information and/or power transfer while the removable welder is docked.

In some examples, the energy storage devices 222A, 222B are rechargeable batteries (e.g., a lithium-ion battery, a nickel-metal hydride battery, lead-acid battery, etc.). In other examples, the energy storage devices 222A, 222B are one or more of a hybrid battery module, a capacitor, a supercapacitor, or any other type of suitable storage device, or a combination of a rechargeable battery pack and a hybrid battery module. In examples, the controller 210 can perform an analysis of one or more characteristic of the energy storage devices 222A, 222B based on manufacturing specifications that can affect useful life of the energy storage devices 222A, 222B, including the type, number and/or the quality of battery cells used.

The controller 210 is configured to monitor and control operation of the system 200, including operation of the first and second removable welders 220A, 220B. The controller 210 can be configured as a microcontroller, or to include a processor 222, to perform as a programmable logic circuit, a system-on-chip, a programmable logic device, and/or any other type of logic circuit. In some examples, the controller 210 can include one or more sensors 224, a control energy storage device 226, a memory storage device 228, a network interface 230, a user interface 232, and/or comparison circuit 234. For example, the user interface 232 (e.g., a switch, a computer input device, etc.) provides options for an operator to control a function of the power sources and/or outputs at the system 200, such as providing instructions to control the power output from the system 200 to output 206, and/or control operations of the first and second removable welders 220A, 220B.

The controller 210 can be implemented in hardware and/or software, and can be configured to receive information from the sensor 218 (i.e. temperature), regarding characteristics of one or more of the first and second energy storage devices 222A, 222B from sensor 224 (i.e. charge level), for example. The information can also correspond to other sensor data, a user input, as well as data related to trend analysis, threshold values, profiles associated with a particular operation, etc., and can be stored in a comparison chart, list, library, etc. The information may be stored in and/or accessed from the memory 228, and/or may be from a remote networked system accessible via the network interface 230.

The controller 210 is further configured to monitor an energy level of the energy storage devices 222A, 222B. This monitoring is typically performed when the first and second removable welders are docked, however wireless and/or wired communication channels can be employed to monitor energy levels when removed. Thus, the comparison circuit 234 compares the energy level to a plurality of threshold energy level, and may provide a power output to one or more of the energy storage devices 222A, 222B in response to the energy level falling below a threshold energy level (e.g., below which the energy storage device would provide degraded performance, damage the energy storage device, and/or based on a user defined setting).

If the energy level falls below a first or low threshold level, the controller 210 can control the engine 202 to activate in response to provide a first power output 214, e.g. via converter 236, a switch, contactor or other connection, in order to condition the power output from the electric generator 204 to recharge the energy storage devices 222A, 222B. During such a recharge operation, the controller 210 continues to monitor the energy level, and controls the engine 202 and/or the connection to deactivate in response to the energy storage value exceeding a high or second threshold energy level. As disclosed herein, the engine 202 may be controlled on a schedule and/or in accordance with a user input, for instance, to prevent automatic start-up of the engine 202 without an operator on site.

In examples, information regarding system usage trends based on the monitored signals can be analyzed and stored (e.g., in memory 228) and/or communicated via the network interface 230. These trends can be used to predict when the controller 210 should control activation of the energy storage devices 222A, 222B to power an output 226A, 226B, the engine 202 to start and/or stop, in response to one or more characteristics, such as a prediction as to when the energy storage level of the energy storage devices 222A, 222B will fall below the first threshold level (e.g., based on a rate of discharge, a starting level of energy storage level, etc.). The usage trends can be specific to the system 100, 200, or be loaded onto the memory 228 (via interfaces 230, 232) to reflect usage trends of other systems.

Additionally or alternatively, the user interface 232 can include a list of operations with either a set of known parameters, or a list of operations that correspond to a learned operation. Thus, the known and/or historical actions and conditions associated with a particular device and/or operation. In some examples, the network interface 230 is configured to send and/or receive information from a remote device (e.g., a remote computer, a cloud computing environment, a smartphone, etc.). The calculations, determinations, comparisons, analysis, stored data, etc., can be performed and/or updated via network interface 230, and/or on a smartphone application.

The network interface 230 can be used to receive and transmit information, such as to control operation of the system 200, including the first and second removable welders 220A, 220B, from the remote system and/or provide alerts or other information to the connected devices (i.e. when a low threshold energy level has been crossed; when a threshold charge level has been crossed; etc.). The information associated with operation of the system 200 can similarly be analyzed in order to build a library of parameters associated with performance of the system 200 and the first and second removable welders 220A, 220B, and shared via the network interface 230.

In some examples, one or more devices may be in direct communication with another component, for example, one or more of the various system components (e.g., the controller 210) can be directly linked to any one or more of the other components (e.g., the electric generator 204, the converter 236, the sensors 224, etc.) to facilitate communication.

In any event, the controller 210 can selectively control the power provided to each output. Consistent with the disclosed examples, each of the outputs 206, 226A, 226B can provide the same level of power (e.g., each operating in a welding mode or a battery recharging mode), or different levels of power. In this example, the output 226A can be operating in a welding mode, and output 226B can be powering a rechargeable battery. In yet another example, the output 206 provides auxiliary 115 or 220 VAC power, independent of or simultaneously during a welding operation to power, e.g., lights, a grinder, a battery charger, etc.

In examples, system sensor(s) 224 monitors characteristics corresponding to, among other things, engine 202 operational parameters (e.g., run time, temperature, fuel consumption, etc.), energy storage devices 222A, 222B parameters (e.g., number of discharge/charge events, depth of charge, time in operation, etc.) and one or more parameters associated with power outputs 214, 215, 216A, 216B, as well as power demand (e.g., a voltage, current, temperature, resistance, impedance, etc.). The information provided by the sensor 224 to the controller 210 is used to determine when the engine 202 and the energy storage devices 222A, 222B are to be employed to output power, for how long, at what level, etc.

Additionally or alternatively, the controller 210 can periodically transmit a test signal to monitor the removable welders 220A, 220B (e.g., to determine when a welding-type torch is present, or when a rechargeable energy storage devices 222A, 222B is fully charged).

In examples, information regarding system usage trends based on the monitored signals can be analyzed and stored (e.g., in memory 228). These stored trends can be used to predict when the controller 210 should control the engine 202, the first and second removable welders 220A, 220B, recharge one or more of the energy storage devices 208, 222A, 222B, etc. The usage trends can be specific to the system 100, 200, or be loaded onto the memory 228 (via interfaces 230, 232) to reflect usage trends of other systems.

In examples, the first and second removable welders 220A, 220B may be functionally identical, where characteristics such that power demand and/or output, connection ports, enclosure size, to name a few, are the same. Thus, each removable welder may be inserted into either the first or second dock, as well as accommodate the same tools and/or accessories. In other examples, one or more features of the first and second removable welders are different. For instance, the first removable welder 220A may have a greater or lower power output rating than the second removable welder 220B. The size or configuration of an enclosure of the first removable welder 220A may be modified to reflect the power output or other specific characteristic, resulting in a first dock 212A size that is different than the second dock 212B.

In some examples, the converter 236 can be used to convert power from one or more power sources for the one or more loads (e.g., to power auxiliary power components, such as a wire feeder, compressed air system, 120-Volt receptacle, rechargeable battery, etc.). In some examples, the converter 236 can be a buck converter, a boost converter and/or a bi-directional converter.

In some examples, an auxiliary power supply 242 can be connected to the system 200 to provide an auxiliary power output to add power to the system 200, for example, to augment or substitute output power, and/or to recharge one or more energy storage devices.

Figure 3:
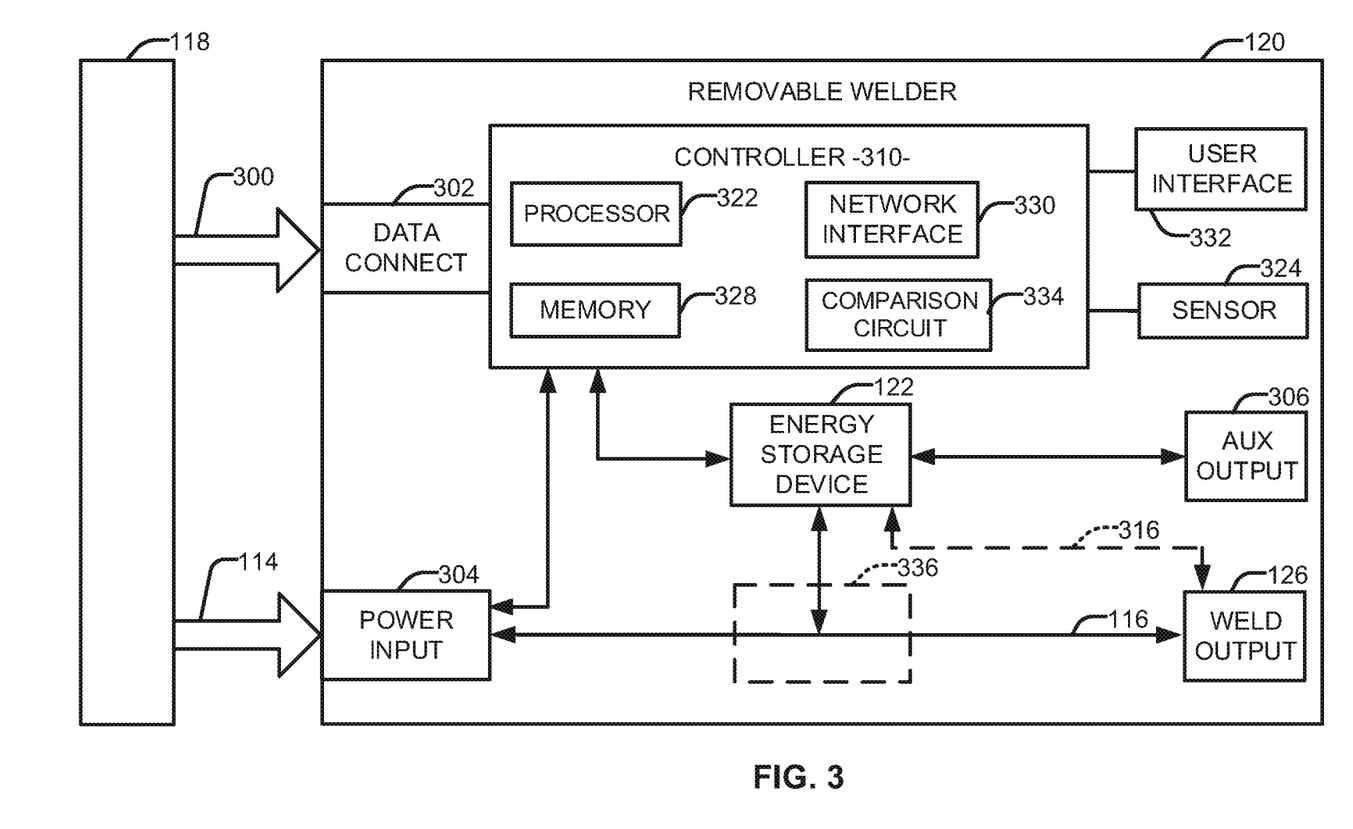
FIG. 3 illustrates a block diagram of an example remote welder in accordance with aspects of this disclosure.

FIG. 3 illustrates an example removable welder 120, in accordance with the present disclosure. The removable welder 120 may include one or more of the components disclosed with respect to the welding systems 100, 200 of FIGS. 1 and 2, respectively. For instance, when removed from a dock (e.g., dock 112, 212A, 212B), the removable welder 120 is configured to perform welding operations independent of the welding systems 100, 200. Thus, the removable welder 120 is equipped with one or more of a welder controller 310, a welder user interface 332, one or more sensors 324, a converter 336, in addition to energy storage device 122.

The controller 310 is configured to send and receive information via a welder network interface 330 (as well as welder user interface 332), store information in memory 328, and analyze information via processor 322 and comparison circuit 334. In some examples, the removable welder 120 is configured with wired and/or wireless communications (e.g., via welder network interface 330) to facilitate communication with the system 100, 200, and/or a remote computing platform (e.g., a smartphone, etc.) to send alerts, receive instructions, analyze data, etc. Thus, controller 310 is configured for independent control and operation of the removable welder 120.

When inserted into a dock 212A, 212B, connector 118 communicates information 300 to the controller 310 via a data connection 302, as well as provides the power output 114 from the system 100, 200 to a power input 304. The power input 304 can provide power output 114 to recharge the energy storage device 122, power the controller 310 (which may contain another energy storage device), as well as provide power output 116 directly to the weld output 126. The power output 116 can be a combination of the first output 114 and the second output 116, which may or may not be conditioned by a converter 336, based on a desired output, attached load, etc. Additionally or alternatively, the converter 336 can condition power to and/or from one or more of the power input 126, the energy storage device 122, the weld output 126 and the auxiliary output 306. In some examples, the energy storage device 122 is configured to provide a power output 316 to one or more of the welding output 126 and the auxiliary output 306, such as when the removable welder 120 is operating independently of the system 100, 200.

Figure 4:
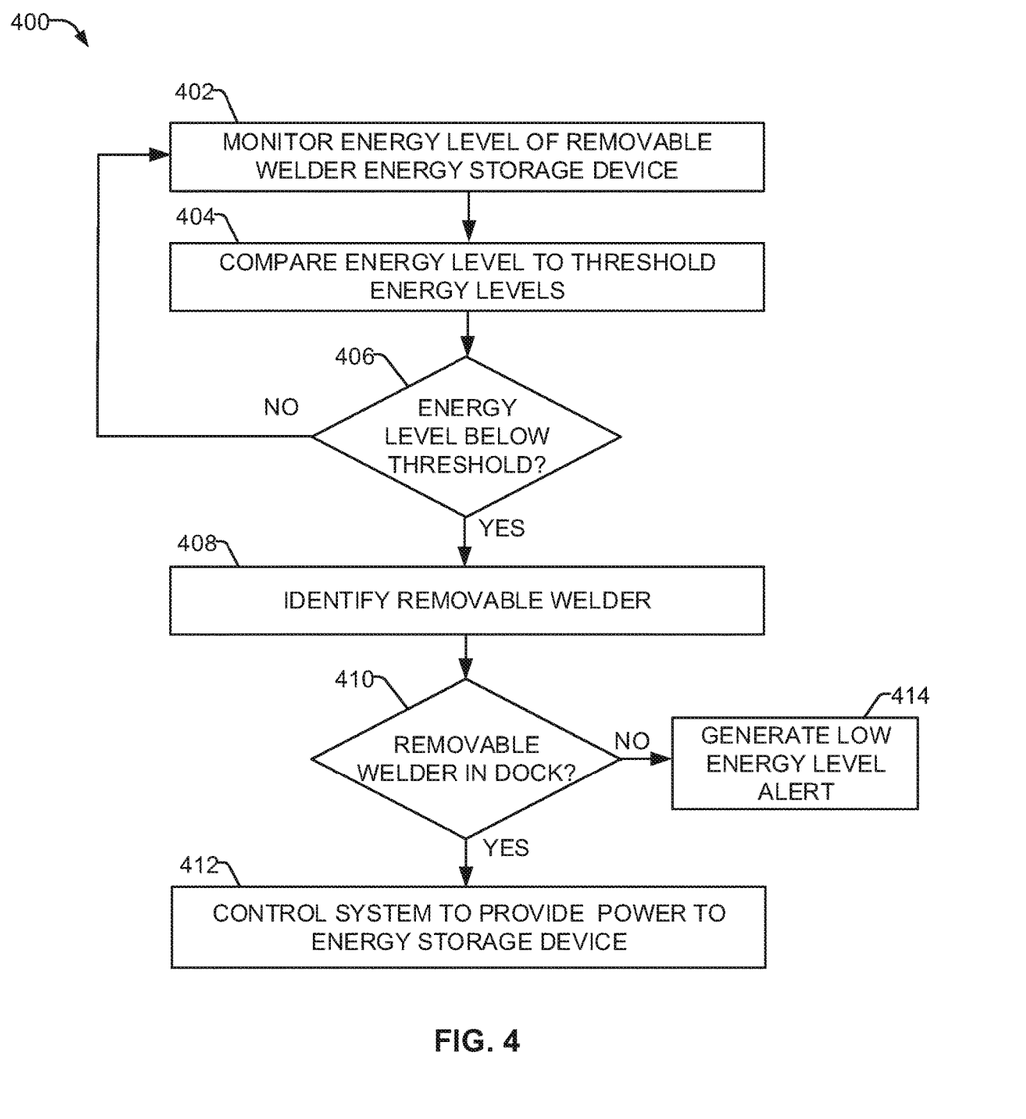
FIG. 4 illustrates an example method of operating a welding-type power system in accordance with aspects of this disclosure.

FIG. 4 is a flowchart illustrating example method 400 of operating a welding-type power system, for example, the welding-type power system 100 of FIG. 1 and the welding-type power system 200 of FIG. 2. The method 400 of FIG. 4 may be implemented by a controller (e.g., controllers 110, 210) by executing machine-readable instructions, such as stored on a non-transitory machine-readable storage device (e.g., memory 228, 328).

At block 402 of method 400, the controller monitors an energy level of an energy storage device (e.g., energy storage device 122, 222A, 222B). For example, the controller receives information associate with the energy level from one or more sensors (e.g., sensor(s) 224, 324) and/or based on an output characteristic (e.g., an output voltage or current level). The energy level is compared to one or more thresholds in block 404 (e.g., at comparison circuit 234, 334). For instance, first and second threshold energy levels can be applied to first and second energy storage devices (e.g., first and second energy storage devices 222A, 222B). Additionally or alternatively, energy levels from each of the first and second energy storage devices can be applied to the first and second threshold energy levels, which may trigger different responses (i.e. generating an alert in response to falling below the first threshold energy level, stopping operations in response to falling below the second threshold energy level, etc.).

At block 406, the controller determines whether the energy level is below a first threshold energy level. If not, then the method returns to block 402 and continues to monitor the energy storage devices. If the energy level is below the first threshold energy level, the method advances to block 408 where the removable welder is identified (e.g., in situations where the system includes multiple removable welders, and/or when multiple energy storage devices including energy storage devices 108, 208 are being monitored).

At block 410, the controller determines whether the removable welder is located in a dock (e.g., dock 112, 212A, 212B). If the removable welder is located in a dock, the process advances to block 412, where the controller controls the system to provide power to the energy storage device (e.g., via generator 104, 204, and/or energy storage device 108, 208). If the removable welder is not located in a dock, such that the removable welder is not available for a recharging operation, an alert is generated that the energy level of the particular energy storage device is below a threshold energy level. In this manner, an operator employing a removable welder independent of the welding-type power system is informed of the low energy level and can adjust the current operation and/or take steps to recharge the energy storage device. The alert can be provided via a user interface on the removable welder (e.g., user interface 332), on the system (e.g., user interface 232), and/or on a networked remote device (e.g., a smartphone, etc.). In some examples, the controller is further configured to end provision of power if recharging operations are not implemented and/or are not successful (i.e. the energy storage device is unable to recharge).

Some or all of the above method 400 may be performed while the removable welder is docked in a housing (e.g., housing 128, 228), and/or removed from the dock and operating independently. Further, some or all of the method 400 can be performed by use of controller 310, integrated with the removable welder itself.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power system comprising:
   an engine configured to drive an electric generator to provide a first power output;
   a removable welder comprising an energy storage device and configured to provide a second power output;
   a housing configured to house the engine, the electric generator, and comprising a dock for storage of the removable welder, the dock comprising a connector to provide the first power output to recharge the energy storage device when the removable welder is stored in the dock; and
   a controller configured to control the removable welder, wherein the controller controls a power transfer to the removable welder based on one or more parameters associated with power transfer received via a user interface, and wherein the controller controls the second power output based, at least in part, on one or more parameters associated with the second power output, and
   wherein the removable welder provides the second power output based on the one or more parameters associated with the second power output.

2. The system of claim 1, the removable welder comprising a welding output, the removable welder configured to provide the second power output to the welding output when removed from the dock and operating as a stand-alone unit.

3. The system of claim 2, wherein the second power output provides welding-type power suitable to perform welding, cutting or cladding operations.

4. The system of claim 2, wherein the welding output is configured to connect with a welding, cutting or cladding tool.

5. The system of claim 2, wherein the removable welder is configured to connect with the first power output when stored in the dock, and to provide the first power output from the welding output when stored in the dock.

6. The system of claim 1, wherein the controller is further configured to control the engine and the generator.

7. The system of claim 6, further comprising a system user interface configured to send information to and receive information from the controller, wherein the information comprises instructions to control the engine, the generator, or the removable welder when the removable welder is stored in the dock.

8. The system of claim 6, wherein the removable welder further comprising a welder user interface configured to control an operation of the removable welder.

9. The system of claim 6, wherein the controller is further configured to control the engine, the generator and the removable welder to combine the first and second power outputs when the removable welder is stored in the dock.

10. The system of claim 1, wherein the removable welder further comprises an auxiliary port to provide an auxiliary output from the energy storage device.

11. The system of claim 1, wherein the housing includes an adjustable door to enclose the removable welder or a locking mechanism to secure the removable welder when stored in the dock.

12. The system of claim 1, wherein the energy storage device comprises one or more of a lead acid battery, a nickel cadmium battery, a lithium ion battery, a capacitor, a super-capacitor, a fuel cell, or any combination thereof.

13. A welding-type power system comprising:
an engine configured to drive an electric generator to provide a first power output;
a first removable welder comprising a first energy storage device and configured to provide a second power output;
a second removable welder comprising a second energy storage device and configured to provide a third power output;
a housing configured to house the engine, the electric generator, and comprising a first and second dock for storage of the first and second removable welders, each dock comprising a connector to provide the first power output to recharge the first and second energy storage devices when the first and second removable welders are stored in the first and second docks; and
a controller configured to:
monitor an energy level of the first and second energy storage devices, wherein a first energy level of the first energy storage device corresponds to a first threshold and a second energy level of the second energy storage device corresponds to a second threshold, and
control the first power output based on the first threshold and the second threshold,
wherein the second power output or the third power output are configured to provide welding-type power or auxiliary power while the first removable welder or the second removable welder are disconnected from the connector of the first dock or the second dock and wherein the first removable welder or the second removable welder provide the second power output or the third power output based on one or more parameters associated with the second power output or the third power output.

14. The system of claim 13, wherein the controller is further configured to:
compare the first and second energy levels to one or more threshold energy levels; and
control a connection to provide the first power output to recharge the first or second energy storage device in response to the first or second energy level of the respective energy storage device falling below a third threshold energy level.

15. The system of claim 14, wherein the connection comprises a power converter configured to condition the first power output to provide battery charging power to the first or second energy storage device.

16. The system of claim 13, wherein the controller is further configured to generate an alert in response to an energy level of the first or second energy storage device falling below a second threshold energy level.

17. The system of claim 13, further comprising a system user interface configured to send information to and receive information from the controller, wherein the information comprises instructions to control the engine, the generator, the first removable welder or the second removable welder when the first or second removable welders are stored in the first dock or the second dock.

18. The system of claim 17, further comprising a system network interface, and where the first and second removable welders each comprises a respective welder network interface configured to communicate with the system network interface.

19. The system of claim 18, wherein the welder network interfaces are configured to send information to and receive information from the system network interface, the information comprising instructions to control the engine, the generator, the first removable welder or the second removable welder.

20. The system of claim 13, wherein the controller is further configured to activate or deactivate the engine based on the first energy level or the second energy level.

21. The system of claim 20, wherein the controller is further configured to deactivate the engine in response to the first energy level or the second energy level exceeding the first or second threshold.

* * * * *